US007372901B2

(12) United States Patent
Holcomb et al.

(10) Patent No.: US 7,372,901 B2
(45) Date of Patent: May 13, 2008

(54) METHOD AND APPARATUS FOR MODEM RATE ADAPTATION

(75) Inventors: Mark Thomas Holcomb, Brockport, NY (US); John Wesley Nieto, Rochester, NY (US); Peter Robert Denecke, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 657 days.

(21) Appl. No.: 10/425,618

(22) Filed: Apr. 30, 2003

(65) Prior Publication Data

US 2004/0218666 A1 Nov. 4, 2004

(51) Int. Cl.
*H04B 3/46* (2006.01)
*H04B 17/00* (2006.01)

(52) U.S. Cl. ................... 375/225; 370/465; 375/222
(58) Field of Classification Search ............... 375/222, 375/225; 370/465
See application file for complete search history.

(56) References Cited

U.S. PATENT DOCUMENTS

| | | | | |
|---|---|---|---|---|
| 5,914,993 A * | 6/1999 | Lepitre et al. | ............... | 375/377 |
| 6,252,854 B1 * | 6/2001 | Hortensius et al. | ......... | 370/252 |
| 6,292,515 B1 * | 9/2001 | Kao et al. | ................... | 375/260 |
| 6,667,991 B1 * | 12/2003 | Tzannes | ..................... | 370/465 |
| 6,757,520 B2 * | 6/2004 | Attar et al. | ................ | 455/63.1 |
| 7,143,320 B2 * | 11/2006 | Cavin | ........................ | 714/704 |
| 2001/0023188 A1 * | 9/2001 | Komatsu | .................... | 455/522 |
| 2003/0104831 A1 * | 6/2003 | Razavilar et al. | ........... | 455/522 |
| 2003/0189977 A1 * | 10/2003 | Sweitzer et al. | ............. | 375/222 |
| 2003/0231655 A1 * | 12/2003 | Kelton et al. | ............... | 370/468 |
| 2004/0190507 A1 * | 9/2004 | Wu et al. | .................... | 370/389 |

* cited by examiner

*Primary Examiner*—Chieh M. Fan
*Assistant Examiner*—Freshteh N Aghdam
(74) *Attorney, Agent, or Firm*—Duane Morris LLP

(57) ABSTRACT

A method and system for dynamically determining transmission characteristics of a modem transmitting information over a network is disclosed. The method comprises the steps of determining a plurality of measured characteristics associated with a plurality of received samples collected over a known period, suggesting a first transmission characteristic from a plurality of known first transmission characteristics associated with a selected second measured characteristic based on a first measured characteristic in relation to a threshold value associated with each of the known first transmission characteristics, adjusting the suggested transmission characteristic dependent upon a third measured characteristic, and providing the suggested characteristics to the network. The method further comprises the steps of validating the suggested characteristics and transmitting a next packet using validated transmission characteristics.

6 Claims, 6 Drawing Sheets

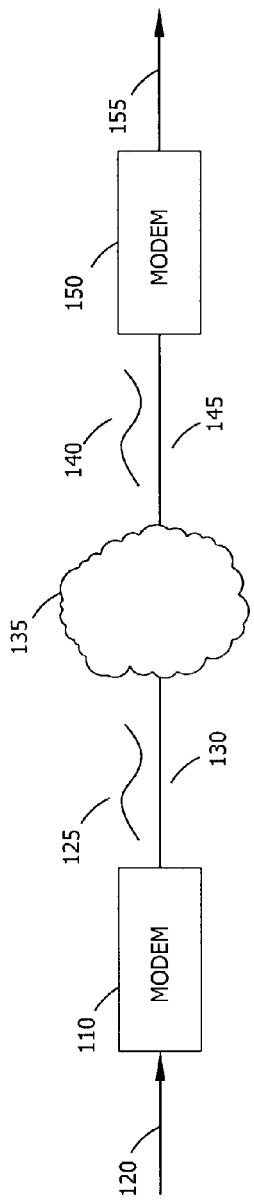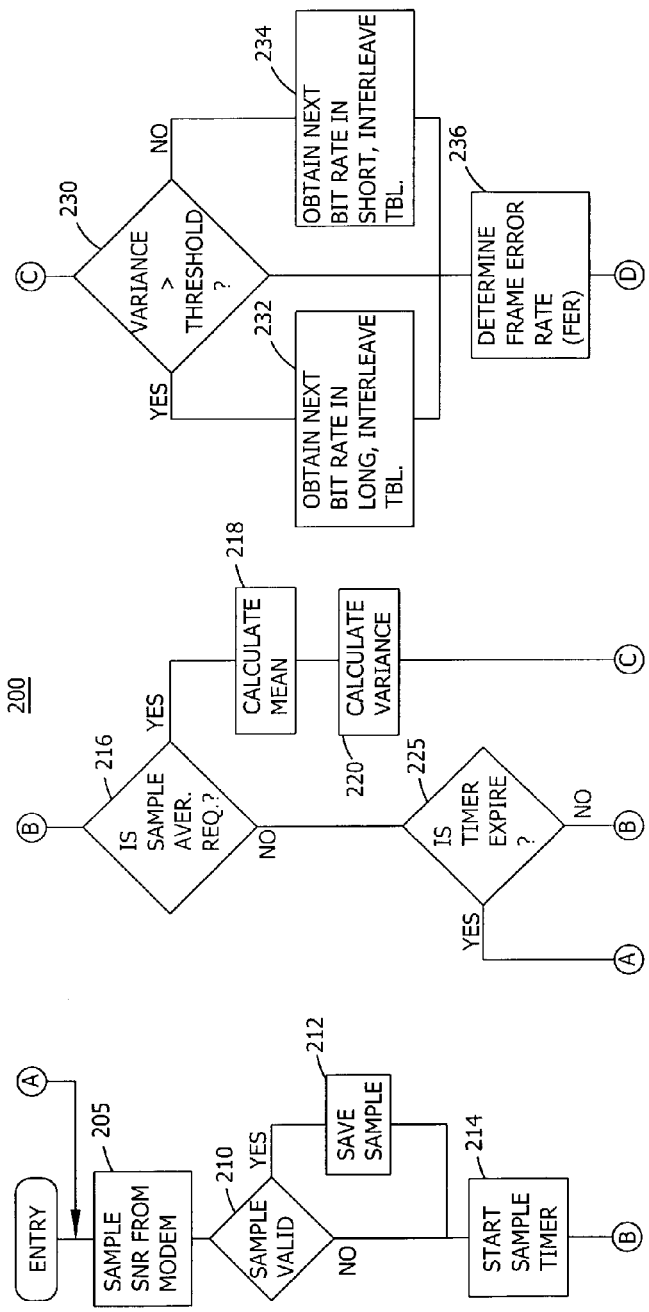

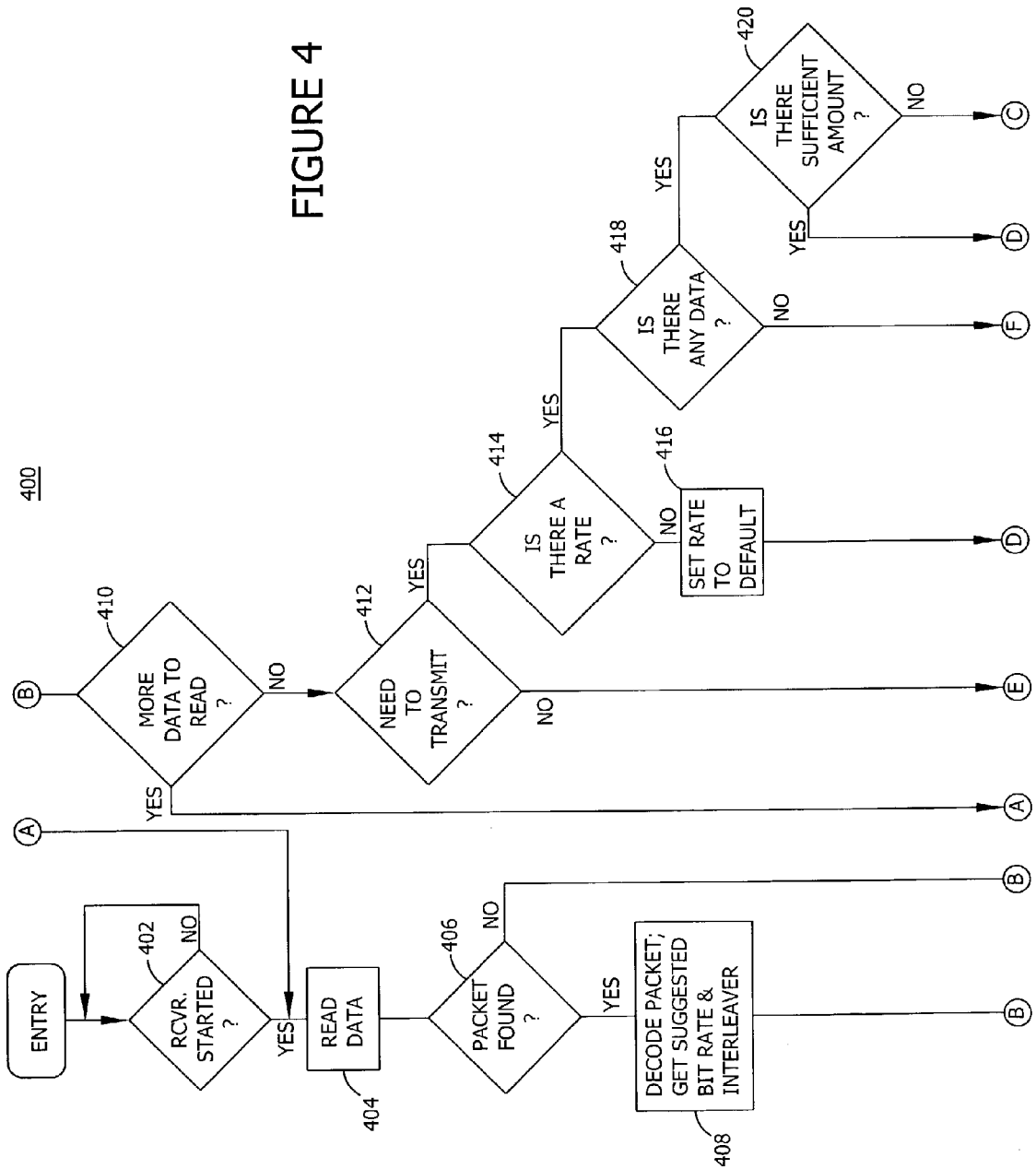

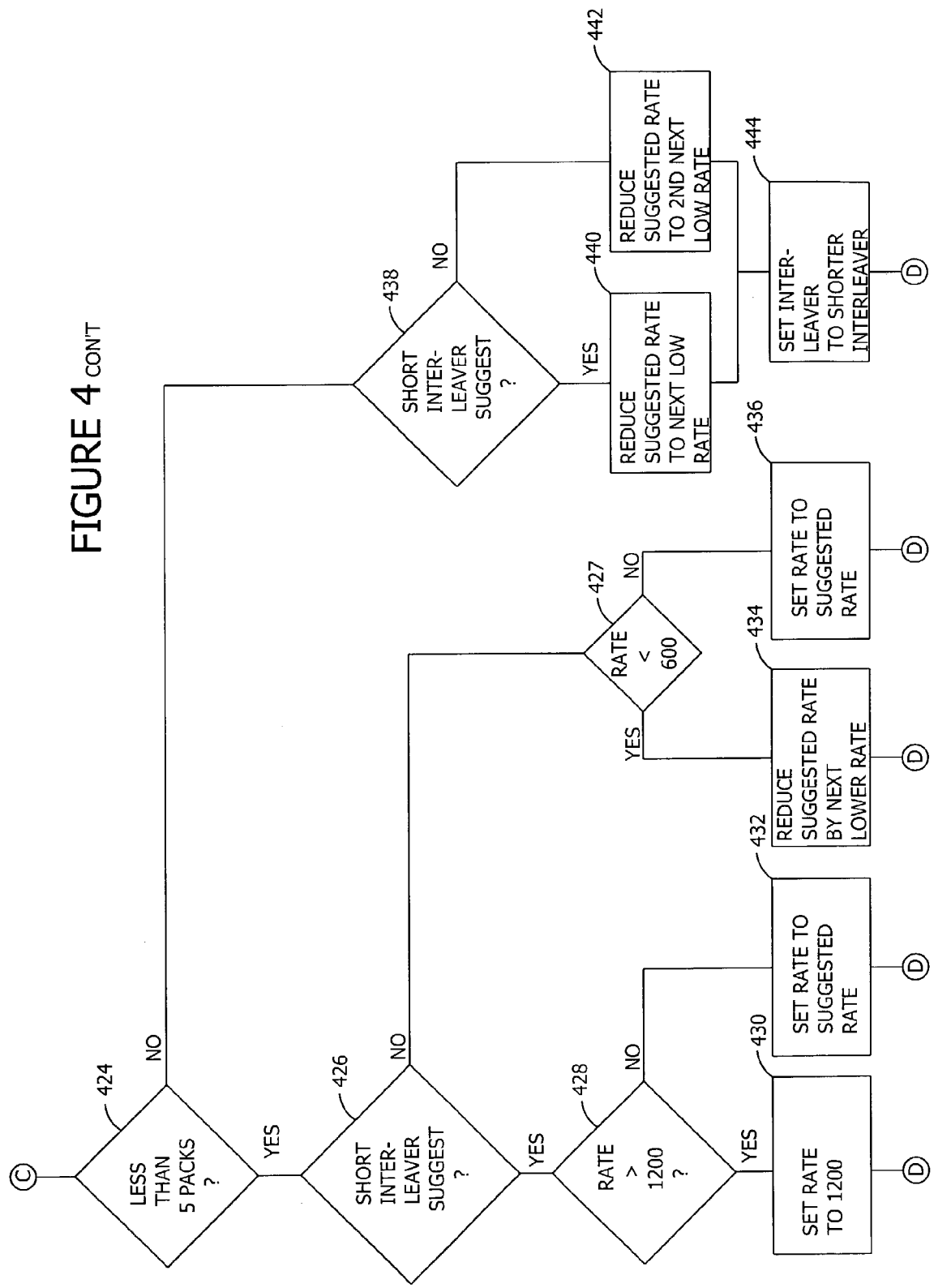

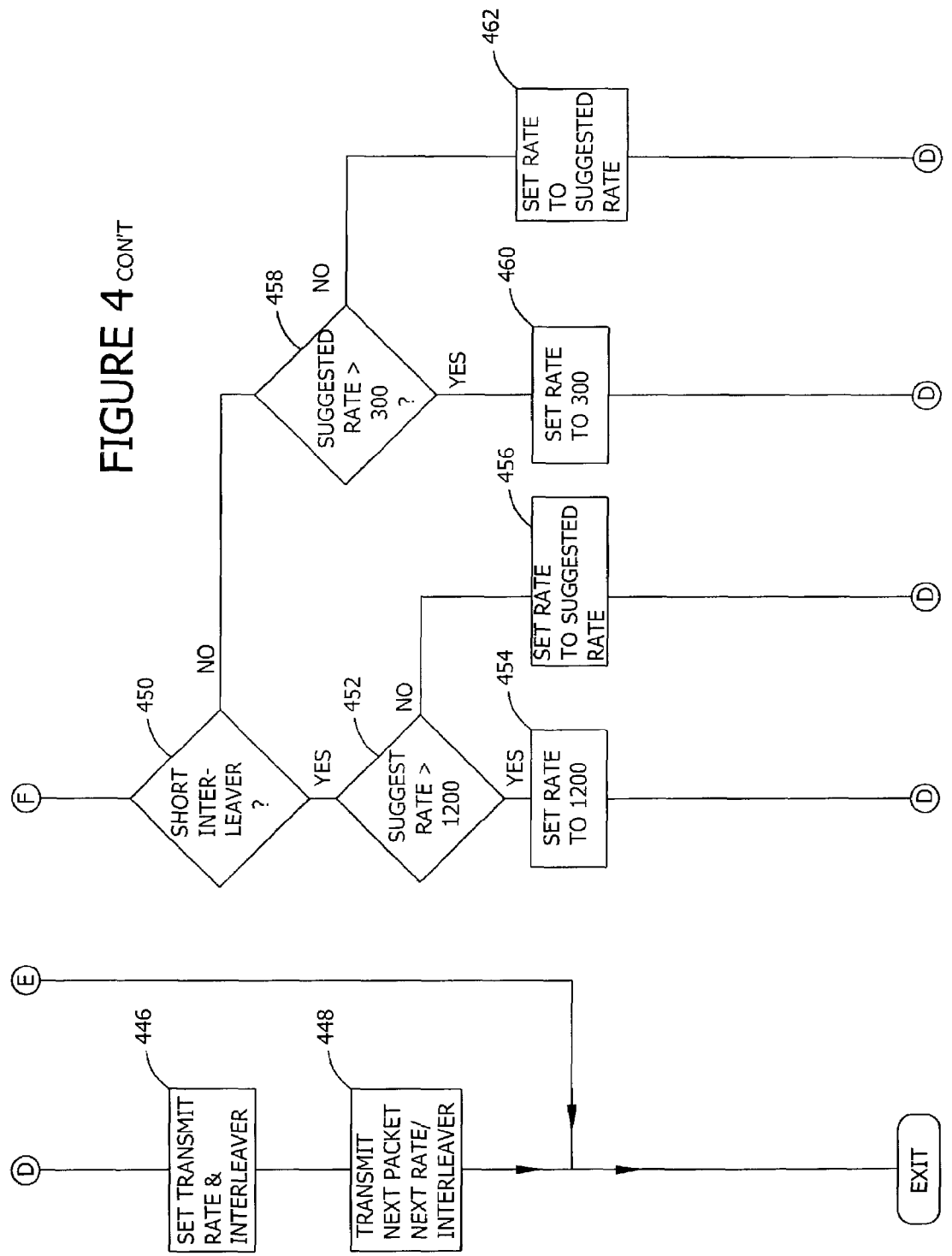

METHOD AND APPARATUS FOR MODEM RATE ADAPTATION

BACKGROUND OF THE INVENTION

This application is related to the field of digital communications and more specifically to dynamically adapting the transmission characteristics of a transmitting modem. FIG. 1 illustrates a block diagram of a conventional digital communication system 100. In this system transmitting modem 110 (modulator/demodulator) receives or accepts digital signal 120 and using well-known methods converts digital signal 120 into analog format. Analog signal 125 is then transmitted over network 135. For example, analog signal 125 may be transmitted, as shown, in a PCM (Pulse Coded Modulation) format.

Analog signal 125 propagates through network 135 and then through connection 145 is applied to receiving modem 150. Modem 150, using well known methods, converts analog signal 140 to digital form 155. The bit-rate and interleaver setting for the transmission is typically fixed to transmit a maximum amount of data bits over the network without errors.

However, noise, multi-path, fading and similar factors contribute to inducing errors in the reception of the transmitted analog signal. To compensate for such errors in transmission, the receiving system can request the transmitting site to re-transmit portions of, or even the entire original message. Repeating a transmission, however, reduces the efficiency of the network transmission, as no new information is transmitted in each re-transmission. Typically, a modem provides numerous bit rates that may be selected for the transmission of data bits. A maximum rate, for example, 9600 bits per second, may provide a high throughput, but requires a low noise interfering channel. Whereas, a minimum bit rate, for example 75 bits per second, may provide a sufficient throughput in a very noisy channel. Other rates less than the maximum provide lower throughputs, but with corresponding increases in robustness.

Another feature offered by a typical modem is the ability to use different interleaver settings to compensate for or combat the effects of a fading channel where errors are distributed unevenly. A typical modem may support six different interleaver settings with latencies as short as 0.12 seconds and as long as 8.61 seconds. An interleaver block provides enhanced error correction by spreading a random burst of errors over a larger number of data bits. This is advantageous as it allows for a more effective use of a forward error correction scheme to correct some or all of the errors detected in transmission. The longer the interleaver setting, the more capable it is to correcting larger bursts of errors, at the expense of increased latency in modulating a transmission and in the receiver turning around. Shorter interleavers provide reduced latency, but are not as robust in presence of multi-path.

Accordingly, a system is needed that dynamically adjusts the modem transmission characteristics in response to unknown and unpredictable changes in channel noise and multi-path to achieve a high data throughput.

Embodiments of a method and system for dynamically determining transmission characteristics of a modem transmitting information over a network is herein disclosed. In one embodiment, a method comprises the steps of determining a plurality of measured characteristics associated with a plurality of received samples collected over a known period, suggesting a first transmission characteristic from a plurality of known first transmission characteristics associated with a selected second measured characteristic based on a first measured characteristic in relation to a threshold value associated with each of the known first transmission characteristics, adjusting the suggested transmission characteristic dependent upon a third measured characteristic, and providing the suggested characteristics to the network. The method further comprises the steps of validating the suggested characteristics and transmitting a next packet using validated transmission characteristics.

BRIEF DESCRIPTION OF THE DRAWINGS

FIG. 1 illustrates a block diagram of a conventional digital communication system;

FIG. 4 illustrates a flow chart of an exemplary process for validating modem bit-transmission characteristics in accordance with the principles of the invention.

Figure 2:
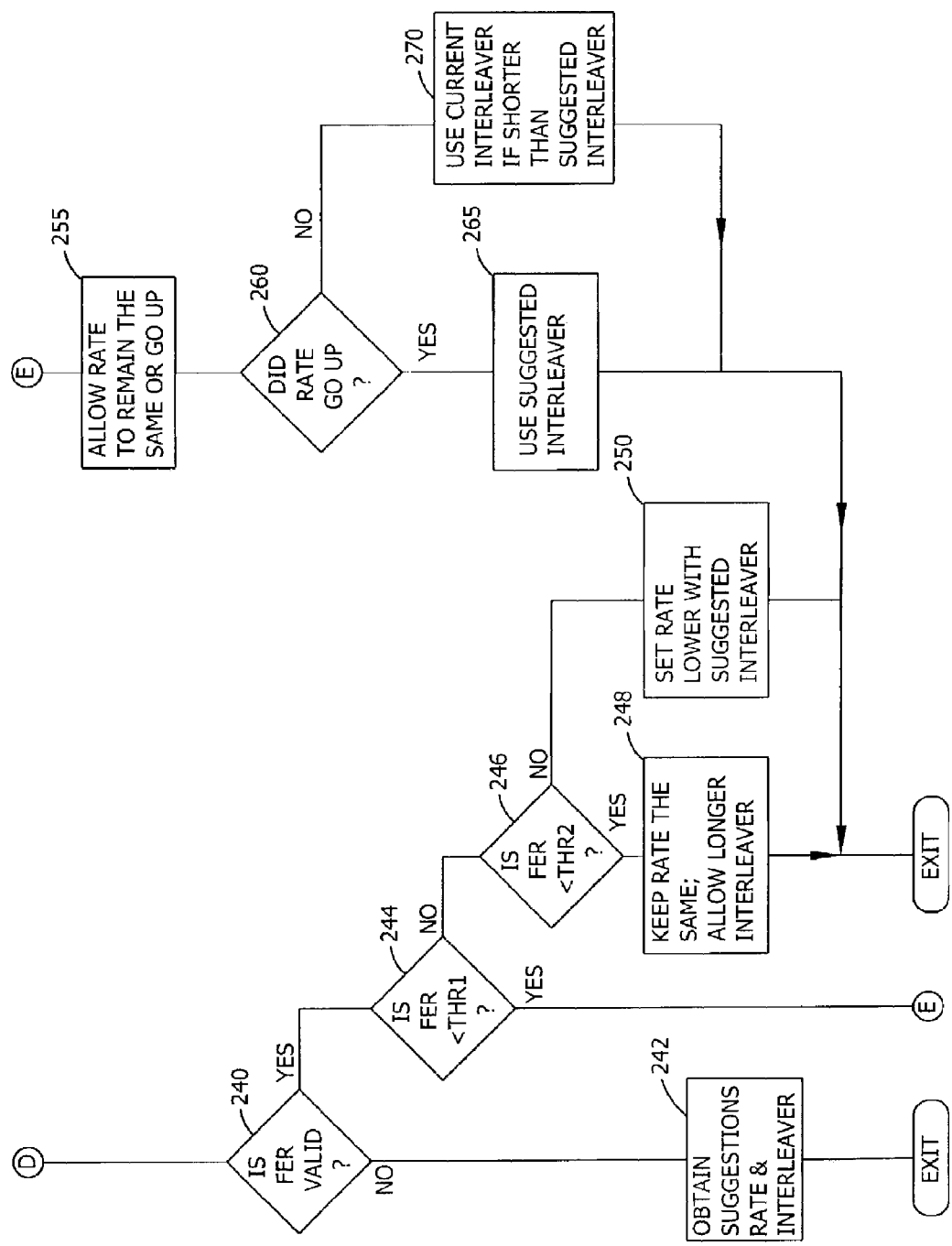
FIG. 2 illustrates a flow chart of an exemplary process for determining modem transmission characteristics in accordance with the principles of the invention.

It is to be understood that these drawings are solely for purposes of illustrating the concepts of the invention and are not intended as a definition of the limits of the invention. The embodiments shown in FIGS. 1 through 4 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

FIG. 2 illustrates a flow chart 200 of an exemplary process for determining transmission characteristics in accordance with the principles of the present invention. In this process, a signal, e.g., SNR sample, is obtained from receiving modem at block 205. A determination is made, at block 210, whether the received sample is valid. If the answer is negative, then a timer is initiated at block 214.

Otherwise, if the answer is in the affirmative, then the sample is saved at block 212 and a timer is initiated at block 214. At block 216, a determination is made whether a sample average is requested. If the answer is negative then a determination is made, at block 225, whether a timer has expired. If the answer is affirmative, then the processing returns to block 205 to obtain a next SNR sample. However, if the answer is negative, then the processing returns to block 216 to await an affirmative response.

Returning to block 216, if the answer is in the affirmative, then transmission characteristics of the received samples is determined at blocks 218, 220 and processing proceed to block 230. In a preferred embodiment of the invention illustrated, the determined transmission characteristics are a mean and variance of a plurality of received SNR samples. As should be appreciated, other statistical parameters, such as a median, a standard deviation, etc., of the received signal samples may similarly be implemented without altering the scope of the invention.

At block 230, a determination is made whether a determined transmission characteristic, preferably a variance, is greater than a known threshold. If the answer is in the negative, then at block 234 a new suggested bit-rate is obtained from a plurality of bit-rates associated with a first known interleaver setting which is associated with a low latency inducing property. However, if the answer is in the affirmative, then at block 232 a new suggested bit-rate is obtained from a plurality of bit-rates associated with a second known interleaver setting associated with a high resistance to a multi-path/fading property.

Accordingly, in this preferred embodiment, a new suggested bit rate is obtained using the SNR sample mean, the current receive bit rate and the associated interleaver setting, as will be further disclosed.

At block 236, a frame error rate (FER) is next determined using well-known methods. At block 240 a determination is made whether the determined FER is valid. In one aspect of the invention, a valid FER is determined as the reception of a selected number of packets having a valid cyclic redundancy check (CRC) value and the sum of the data in the selected number of packets being greater than a predefined size, for example, 100 octets.

If the answer at block 240 is negative, then a default suggested bit-rate and interleaver value are obtained at block 242. However, if the answer at block 240 is in the affirmative, then a determination is made, at block 244, whether the determined FER is less than a known threshold value. If the answer at block 244 is in the negative, then a determination is made, at block 246, whether the determined FER is less than a second known threshold value. If the answer at block 246 is in the affirmative, then suggested transmission characteristic values are set to retain the current bit-rate and allow a switch to a more robust interleaver value at block 248. However, if the answer at block 246 is negative, then suggested transmission characteristics are set to lower the bit-rate with a suggested interleaver setting.

Table 1 illustrates for a Gaussian channel (i.e., a non-fading channel) an exemplary mapping for a measured value, e.g., mean bit rate, to new or suggested bit rate values associated with a known interleaver setting for a typical modem that supports rates from 75 bits/sec to 9600 bits/sec. In accordance with the principles of the invention, a plurality of threshold values are associated with each current bit rate and each threshold value is further associated with a suggested bit rate. The plurality of threshold values are compared to the determined mean value and a suggested bit rate is determined as that rate in which the threshold is not less than the mean that is associated with the next bit rate.

More specifically, a current bit rate sets the desired row such that, for example, when the current bit rate is 75 bits/second then the first row of Table 1 is selected. The threshold values of the selected row are then scanned in relation to the determined mean. For example, in one aspect of the invention, a suggested bit rate may be associated with that column wherein the threshold value contained therein is less than the reported mean when comparing in a right to left manner.

TABLE 1

Gaussian Channel (Non-Fading)

| Current Bit Rate | Suggested Bit Rate | | | | | | | | | | |
|---|---|---|---|---|---|---|---|---|---|---|---|
| | 75 | 150 | 300 | 600 | 1200 | 2400 | 3200 | 4800 | 6400 | 8000 | 9600 |
| 75 | −5 | −2 | 0 | 3 | 5 | 9 | 10 | 12 | 15 | 19 | 22 |
| 150 | −5 | −2 | −1 | 3 | 5 | 9 | 10 | 12 | 15 | 19 | 22 |
| . | . | . | . | . | . | . | . | . | . | . | . |
| 9600 | −5 | −2 | 0 | 3 | 5 | 9 | 10 | 12 | 15 | 19 | 22 |

Similarly, Table 2 illustrates for a fading channel an exemplary mapping for a measured value, e.g., mean bit rate, to new or suggested bit rate values associated with a known interleaver setting for a typical modem that supports rates from 75 bits/sec to 9600 bits/sec.

TABLE 2

Fading Channel

| Current Bit Rate | Suggested Bit Rate | | | | | | | | | | |
|---|---|---|---|---|---|---|---|---|---|---|---|
| | 75 | 150 | 300 | 600 | 1200 | 2400 | 3200 | 4800 | 6400 | 8000 | 9600 |
| 75 | −2 | 0 | 2 | 7 | 8 | 9 | 10 | 15 | 17 | 23 | 26 |
| 150 | −2 | −1 | 1 | 3 | 6 | 10 | 12 | 15 | 17 | 23 | 26 |
| . | . | . | . | . | . | . | . | . | . | . | . |
| 9600 | −2 | −1 | 0 | 5 | 7 | 10 | 12 | 15 | 17 | 23 | 26 |

It should be understood by those of skill in the art that the values shown in Tables 1 and 2 are exemplary only and shall not be construed as limiting the invention in any way.

Returning to the determination at block 244, if the answer is in the affirmative, then at block 255 the next suggested rate is allowed to increase or remain the same. At block 260, a determination is made as to whether the suggested bit-rate is greater than the current rate. If the answer is in the affirmative, the suggested transmission characteristic is set to the suggested interleaver value at block 265. However, if the answer is negative at block 260, then at block 270 the current interleaver is maintained if it is a low latency interleaver, otherwise the suggested transmission characteristic is set to the suggested interleaver.

The suggested transmission characteristics are then returned to the transmitting site to allow the transmitting site to adapt the transmission characteristics of the transmitting modem to the suggested values.

Figure 3:
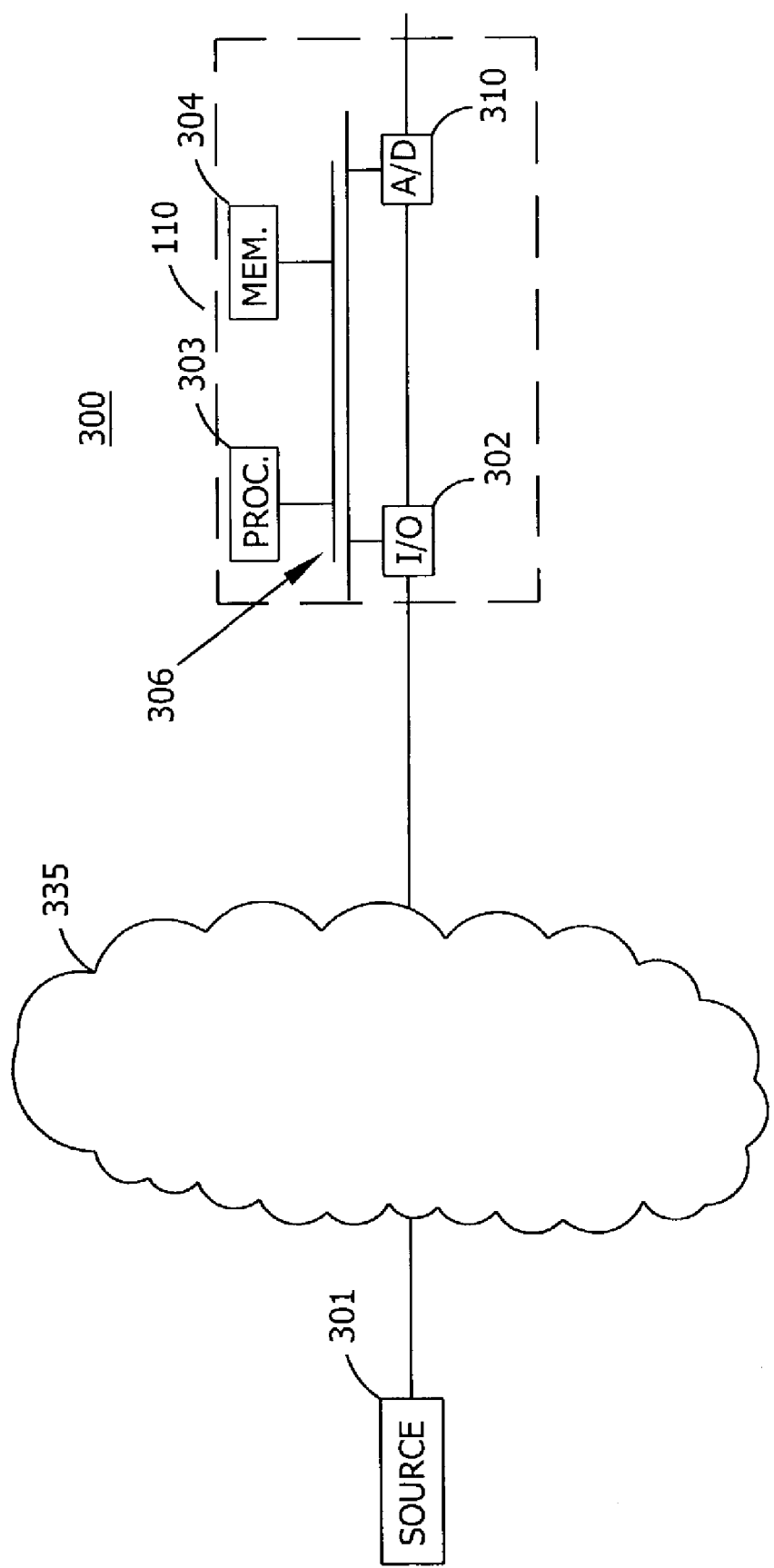
FIG. 3 illustrates a system for determining transmission characteristic settings in accordance with the principles of the invention.

FIG. 3 illustrates an exemplary system employing receiving modem 150 that may be used for implementing the principles of the present invention. System 300 may represent a desktop, laptop or palmtop computer, a personal digital assistant (PDA), as well as portions or combinations of these and other devices. Modem 150 may contain one or more input/output devices 302, processors 303, and memories 304, that are operable to execute the processing illustrated in FIG. 2.

Modem 150 may receive information from one or more sources 301. Information contained at sources 301 may be stored in permanent or semi-permanent media, such as RAM, ROM, hard disk drive, optical disk drive or other image storage devices or may also be obtained dynamically and in real-time. Sources 301 may be accessed over one or more network connections for transmitting and receiving information from, for example, a global computer communications network 335, such as the Internet, a wide area network, a metropolitan area network, a local area network, a terrestrial broadcast system, a cable network, a satellite network, a wireless network, or a telephone network, as well as portions or combinations of these and other types of networks.

Input/output devices 302, processors 303 and memories 304 may communicate over a communication medium 306. Communication medium 306 may represent, for example, an internal communication bus or network, one or more internal connections of a circuit, circuit card or other apparatus, as well as portions and combinations of these and other communication media. Input data from sources 301 may be received by I/O device 302, and in accordance with one or more software programs that may be stored in memories 304 and executed by processors 303. Processing for determining transmission characteristics, in accordance with the process shown in FIG. 2, may then executed by processors 303 and returned to transmitting source 301 via network 335, for example.

Processors 303 may be any means, such as a general purpose or a special purpose computing system, or may be a hardware configuration, such as a laptop computer, desktop computer, handheld computer, dedicated logic circuit, integrated circuit, Programmable Array Logic (PAL), Application Specific Integrated Circuit (ASIC), etc., that provides a known output in response to known inputs.

In a one embodiment, coding and decoding employing the principles of the present invention is implemented by computer readable code executed by processor 303. The code may be stored in the memory 304 or read/downloaded from a memory medium such as a CD-ROM or floppy disk (not shown) in communication with processor 303 or I/O device 302. In other embodiments, hardware circuitry may be used in place of, or in combination with, software instructions to implement the invention. For example, the elements illustrated herein may also be implemented as discrete hardware elements.

As will be understood by those of skill in the art, the term processor may represent one or more processing units or computing units in communication with one or more memory units and other devices, e.g., peripherals, connected electrically, electronically, or wirelessly to and communicating with the at least one processing unit. Furthermore, the devices may be electrically, electronically or wirelessly connected to the one or more processing units via internal busses, e.g., ISA bus, microchannel bus, PCI bus, PCMCIA bus, wireless etc., or one or more internal connections of a circuit, circuit card or other device, as well as portions and combinations of these and other communication media or an external network, e.g., the Internet or an Intranet.

As will be appreciated by those of skill in the art, modem 150 further includes at least one analog-to-digital converter 310 operable to convert a received analog signal into a digital signal.

FIG. 4 illustrates a flow chart 400 of an exemplary process operated by a transmitting modem for acknowledging and validating transmission characteristics suggested by a receiving modem in accordance with the principles of the present invention. In this exemplary process, a determination is made, at block 402, whether a signal has been received. If the answer is negative, then the processing waits at block 402 for a signal reception. If, however, the answer is in the affirmative, then the received data is read at block 404. A determination is next made at block 406 to determine whether a packet has been detected. If the answer is in the affirmative, then the received packet is decoded and the suggested transmission characteristics, e.g., suggested bit-rate and interleaver setting, are extracted from the packet. At block 410, a determination is made whether additional data is available to be read. If the answer is in the affirmative, then processing returns to block 404 to read additional data. If the is negative, a determination is made at block 412 as to whether a transmission is necessary. If the answer at block 412 is negative, then processing is completed and the current transmission bit-rate and interleaver setting are maintained. However, if the answer at block 412 is in the affirmative, then a determination is made at block 414 as to whether a suggested rate is available. If the answer at block 414 is negative, then a default rate is validated as a next rate at block 416, which is preferably the current rate. The transmission rate is next set to the validated transmission characteristic at block 446 and a next packet (or group of packets) is transmitted with the decided transmission characteristics at block 448.

Returning to the determination at block 414, if the answer is in the affirmative, then a determination is made at block 418 as to whether there are data packets to transmit. If the answer at block 418 is negative, i.e., an acknowledgement is required, processing continues at block 450, in which a determination is made as to whether a low latency interleaver setting is suggested. If the answer at block 450 is in the affirmative, then a determination is made, at block 452, as to whether the suggested rate is greater than a known threshold; preferably 1200 bits/sec. This threshold is chosen as to provide sufficient size for the acknowledgement to fit into a single interleaver block. If the answer at block 452 is in the affirmative, then at block 454 the bit-rate is determined and validated (i.e., set) as the known threshold value, which is preferably 1200 bits/sec. The transmission rate is then set to the validated transmission characteristic at block 446 and a next packet (or group of packets) is transmitted with the validated transmission characteristics at block 448.

However, if the answer at block 452 is negative, the suggested rate is validated as the next bit rate. The transmission rate is set to the validated transmission characteristic at block 446 and the next packet (or group of packets) is transmitted with the decided transmission characteristics at block 448.

Returning to the determination at block 450, if the answer is negative, then a determination is made, at block 458, as to whether the suggested rate is greater than a known threshold; preferably 300 bits/sec as shown in FIG. 4. This threshold is chosen as to provide sufficient size for the acknowledgement to fit into a single interleaver block. Therefore, it shall be understood by those of skill in the art that the threshold may be other than 300 bits/sec. If the answer at block 458 is in the affirmative, then at block 460 the bit-rate is determined and validated as the known threshold value, which is preferably 300 bits/sec. The transmission rate is then set to the validated transmission characteristic at block 446 and a next packet (or group of packets) is transmitted with the validated transmission characteristics at block 448.

However, if the answer at block 458 is negative, the suggested rate is validated as the next bit rate at block 462. The transmission rate is set to the validated transmission characteristic at block 446 and the next packet (or group of packets) is transmitted with the decided transmission characteristics at block 448.

Returning to the determination at block 418, if the answer is in the affirmative, then a determination is made at block 420 as to whether there is a sufficient amount of data to transmit. If the answer at block 420 is in the affirmative, then the transmission rate is validated as the suggested rate at block 446 and a next packet (or group of packets) is transmitted with the validated transmission characteristics at block 448.

However, if the answer at block 420 is negative, then a determination is made at block 424 as to whether less than a known number of packets, preferably five (5), are available for transmission. It shall be understood by those of skill in the art that the invention is not limited to five packets. If the answer at block 424 is in the affirmative, then a determination is made at block 426, as to whether a low latency interleaver setting value is suggested. If the answer at block 426 is in the affirmative, then a determination is made at block 428 as to whether the suggested rate is greater than a known threshold value, preferably 1200 bit/sec. If the answer at block 428 is in the affirmative, then at block 430 the suggested rate is set to the known threshold value, which is preferably 1200 bits/sec. Then, at block 446, the transmission rate is set to the validated transmission characteristic. A next packet (or group of packets) is transmitted with the decided transmission characteristics at block 448.

However, if the answer, at block 428, is negative then the suggested bit rate is validated at block 432 and the transmission rate is set to the validated transmission characteristic at block 446. A next packet (or group of packets) is transmitted with the determined transmission characteristics at block 448.

Returning to the determination at block 426, if the answer is negative, then a determination is made at block 427 as to whether the suggested rate is less than a known value, preferably 600 bits/sec. If the answer at block 427 is in the affirmative, then the validated rate is set as a next lower rate to the suggested bit rate at block 434. The transmission rate is then set to the validated transmission characteristic at block 446 and a next packet (or group of packets) is transmitted with the decided transmission characteristics at block 448.

If the answer to the determination at block 427 is negative, then the suggested bit rate is validated at block 436 and the transmission rate is set to the validated transmission characteristic at block 446. A next packet (or group of packets) is transmitted with the decided transmission characteristics at block 448.

Returning to the determination at block 424, if the answer is negative, then a determination is made at block 438 as to whether a low latency interleaver value is suggested. If the answer at block 438 is in the affirmative, then the validated bit rate is selected as a next lower bit-rate from the suggested bit-rate at block 440. The interleaver value is further set as the low latency interleaver value at block 444. The transmission rate is set to the validated transmission characteristic at block 446 and a next packet (or group of packets) is transmitted with the decided transmission characteristics at block 448.

However, if the answer at block 438 is negative, then the bit-rate is validated as a second next lower bit-rate from the suggested bit-rate at block 442. The interleaver value is then set to a low latency interleaver value at block 444 and the transmission rate is set to the validated transmission characteristic at block 446. A next packet (or group of packets) is transmitted with the decided transmission characteristics at block 448.

Although not shown in detail, it will be appreciated that a transmission modem 110, similar to modem 150, contains structural components that are operative to execute the processing similar to that shown in FIG. 4 with regard to digital-to-analog conversion. Modem technology is well-known in the art and accordingly need not be explained in detail herein.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for dynamically determining transmission characteristics of a modem transmitting information, comprising:
    determining a first, a second, and a third measured characteristic value for signal samples received over a known time period;
    determining a first transmission characteristic value based on said first measured characteristic value;
    determining a second transmission characteristic value based on said second measured characteristic value;
    providing said first and said second determined transmission characteristic values to said modem if said third measured characteristic value is less than a first threshold; and
    adjusting at least one of said first and second determined transmission characteristic values if said third measured characteristic value is greater than a second threshold and providing said at least one adjusted first and second determined transmission characteristic values to said modem, wherein said first measured characteristic value is a variance value, and wherein said second measured characteristic value is a mean value.

2. The method of claim 1 wherein said third measured characteristic value is a frame error rate.

3. A method for dynamically determining transmission characteristics of a modem transmitting information, comprising:
    determining a mean value for signal samples received over a known time period;
    determining a variance value for said samples;
    determining an interleaver setting based on said variance value, wherein said interleaver selling is a first transmission characteristic;
    determining a data rate value based on said mean value and said interleaver setting, wherein said data rate value is a second transmission characteristic;
    determining a frame error rate for said samples;
    providing said first and second determined transmission characteristics to said modem if said frame error rate is less than a first threshold; and
    adjusting at least one of said first and second determined transmission characteristics if said frame error rate is greater than a second threshold and providing said at least one adjusted first and second determined transmission characteristic values to said modem.

4. A system for dynamically determining transmission characteristics of a transmitting modem transmitting information, comprising:
    a receiving modem operable to receive a signal, said modem comprising a processor;
    said processor operable to execute code to:
    determine a first, a second, and a third measured characteristic value for signal samples of said signal received over a known time period;
    determine a first transmission characteristic value based on said first measured characteristic value;
    determine a second transmission characteristic value based on said second measured characteristic value;
    provide said first and said second determined transmission characteristic values to said transmitting modem if said third measured characteristic value is less than a first threshold; and
    adjust at least one of said first and second determined transmission characteristic values if said third measured characteristic value is greater than a second threshold and provide said at least one adjusted first and second determined transmission characteristic values to said transmitting modem, wherein said first measured characteristic value is a variance value, and wherein said second measured characteristic value is a mean value.

5. The system of claim 4 wherein said third measured characteristic value is a frame error rate.

6. A system for dynamically determining transmission characteristics of a transmitting modem transmitting information, comprising:
    a receiving modem operable to receive a signal, said modem comprising a processor;
    said processor operable to execute code to:
    determine a mean value for signal samples received over a known time period;
    determine a variance value for said samples;
    determine an interleaver setting based on said variance value, wherein said interleaver setting is a first transmission characteristic;
    determine a data rate value based on said mean value and said interleaver setting, wherein said data rate value is a second transmission characteristic;
    determine a frame error rate for said samples;
    provide said first and second determined transmission characteristics to said transmitting modem if said frame error rate is less than a first threshold; and
    adjust at least one of said first and second determined transmission characteristics if said frame error rate is greater than a second threshold and provide said at least one adjusted first and second determined transmission characteristic values to said transmitting modem.

* * * * *